US011880708B2

(12) United States Patent
Eloy et al.

(10) Patent No.: US 11,880,708 B2
(45) Date of Patent: Jan. 23, 2024

(54) METHOD FOR DETECTING THE DISAPPEARANCE OF A TASK

(71) Applicant: VITESCO TECHNOLOGIES GMBH, Hannover (DE)

(72) Inventors: Stéphane Eloy, Toulouse (FR); Nicolas Romea, Toulouse (FR)

(73) Assignee: VITESCO TECHNOLOGIES GMBH, Hannover (DE)

( * ) Notice: Subject to any disclaimer, the term of this patent is extended or adjusted under 35 U.S.C. 154(b) by 350 days.

(21) Appl. No.: 17/274,905

(22) PCT Filed: Sep. 10, 2019

(86) PCT No.: PCT/EP2019/074103
§ 371 (c)(1),
(2) Date: Mar. 10, 2021

(87) PCT Pub. No.: WO2020/053208
PCT Pub. Date: Mar. 19, 2020

(65) Prior Publication Data
US 2022/0058051 A1    Feb. 24, 2022

(30) Foreign Application Priority Data

Sep. 11, 2018    (FR) ...................................... 1858119

(51) Int. Cl.
*G06F 9/46*    (2006.01)
*G06F 9/48*    (2006.01)
*G06F 9/52*    (2006.01)

(52) U.S. Cl.
CPC ............... *G06F 9/485* (2013.01); *G06F 9/52* (2013.01)

(58) Field of Classification Search
CPC .................................. G06F 9/485; G06F 9/52
See application file for complete search history.

(56) References Cited

U.S. PATENT DOCUMENTS 6,275,987 B1   8/2001   Fraley et al.
2007/0168764 A1   7/2007   Simpson et al.

FOREIGN PATENT DOCUMENTS

DE   10 2013 202 774   8/2014
FR       3 060 150   6/2018

OTHER PUBLICATIONS

International Search Report for PCT/EP2019/074103 dated Jan. 13, 2020, 6 pages.
Written Opinion of the ISA for PCT/EP2019/074103 dated Jan. 13, 2020, 5 pages.

*Primary Examiner* — Gregory A Kessler
(74) *Attorney, Agent, or Firm* — NIXON & VANDERHYE

(57) ABSTRACT

Disclosed is a method for detecting a disappearance of a task in an environment including at least one recurring parent task that triggers, in nominal mode, on each occurrence, at least one child task, including the following steps: evaluating a parent duration elapsed between the last occurrence and the penultimate occurrence of the parent task, evaluating a child duration elapsed between the last occurrence and the penultimate occurrence of the child task, comparing the parent duration and the child duration, it being concluded that an occurrence of the child task has disappeared if the child duration, preferably with a margin, is longer than the parent duration.

19 Claims, 4 Drawing Sheets ered to as Ei. Likewise the penultimate
METHOD FOR DETECTING THE DISAPPEARANCE OF A TASK

CROSS-REFERENCE TO RELATED APPLICATIONS

This application is the U.S. national phase of International Application No. PCT/EP2019/074103 filed Sep. 10, 2019 which designated the U.S. and claims priority to FR 1858119 filed Sep. 11, 2018, the entire contents of each of which are hereby incorporated by reference.

BACKGROUND OF THE INVENTION

Field of the Invention

The present invention generally relates to the field of engine control. It in particular relates to a method for detecting a disappearance of a task.

Description of the Related Art

It is known in software, such as software for controlling/commanding an internal combustion engine, to divide the complete software application into tasks. A task is a piece of software that runs sequentially on a single processing unit. Thus, in a multi-processing-unit system, such as a multi-core processor, a task is an elementary unit of distribution of the software to the multiple units. In such software, a task is often recurring in that an occurrence of the task is executed each time an event occurs. A task is then periodic, if the recurring event is periodic, and aperiodic if the recurring event is aperiodic. In the case of engine control, there are two types of tasks: periodic tasks that are sequenced with a set period by a clock, and aperiodic tasks that are sequenced by a recurring but non-periodic event. An example of an aperiodic task is a task that is synchronous with the rotation of the engine, such as a task related to engine speed, such as for example a task sequenced by preset edges of a crankshaft sensor.

Dividing up an initially sequential piece of software to distribute it between a plurality of processing units produces a plurality of tasks. These tasks, although executed by separate processing units, must be executed in the same order as they initially were in the divided piece of software. To this end, the successive tasks are typically linked: an upstream task in the sequence, or parent task, triggers the execution of a downstream task, or child task.

An operating system manages task execution, allowing higher priority tasks to execute rapidly while guaranteeing that lower priority tasks are executed.

Certain aperiodic tasks that are synchronous with the engine see their pseudo-period decrease with an increase in engine speed. This results in an increase in the computational load on the one or more processors, which must execute such tasks more often. In the event of a very heavy load, the operating system must take measures to regulate this load. To this end, the operating system makes judgements and may need to delete a task. Other causes may also be the origin of a disappearance of a task.

If the implementation of the linked tasks of a piece of software is not robust with respect to task disappearance, the information consumed or produced by the task that has disappeared will become lost, inconsistent or corrupt. This may cause a malfunction, which may lead to detrimental engine-control instability.

Depending on how it is implemented, the operating system may report its deletion action. However, the monitoring and/or diagnostic functions that deliver such reports are executed with a very low priority. Thus, in the event of a heavy load, the information on the deletion/disappearance of a task is received far too late for effective countermeasures to be taken to correct the consequences of the disappearance.

In addition, if the disappearance of a task is not due to a judgement, the operating system may not be informed thereof.

One of the consequences of the problem will now be illustrated by way of a simplified example comprising a recurring parent task TM that is executed by a processing unit C1 and that triggers, on each occurrence thereof, a child task TF that is executed by another processing unit C2.

A recurring event is designated E, generically. Its occurrences are specified by an index. In order to properly describe it, an occurrence of an event may be designated by an absolute index or by a relative index. The absolute index uses lower-case letters in alphabetical order. The relative index uses a notation i-j, where i represents the last occurrence, here the absolute occurrence c, and j the rank of previousness relative to the occurrence i. Thus three successive elements are designated, in an absolute way: Ea, Eb, Ec. If Ec is the last occurrence to have occurred, it is also the last occurrence and is denoted Ei. Likewise the penultimate event is denoted Ei−1, the antepenultimate event is denoted Ei−2, etc. For example, if a parent task is designated TM, its second occurrence is designated TMb and its penultimate occurrence is designated TMi−1. A letter T designates a task. A letter D designates a duration. A letter t designates a time or a date. A letter M specifies parent and F specifies child. A letter X designates a datum.

In FIGS. 1-4, time flows from left to right. The first row relates to a first processing unit or core C1, the intermediate row features a shared memory M and the third row relates to a second processing unit or core C2. The rectangles represent occurrences of a task. The rounded rectangles represent exchanged data. The dotted arrows indicate triggering or linking of tasks. Solid arrows indicate operations of reading or writing data.

The timing diagram of FIG. 1 shows a nominal situation that is illustrated by means of a parent task TM and a child task TF, three successive occurrences TMa, TMb, TMc of which have been shown. Since TMc is the last occurrence, it is also designated TMi. TMb is the penultimate occurrence and is also designated TMi−1. TMa is the antepenultimate occurrence and is also designated TMi−2.

The last occurrence TMi or TMc of the parent task TM produces a last datum Xi or Xc, stores it in memory M, and triggers the execution of the last occurrence TFi or TFc of the child task TF. This last occurrence TFi or TFc reads the last datum Xi or Xc with a view to processing it. Analogously, previously, the penultimate occurrence TMi−1 or TMb produced and recorded in memory M the penultimate datum Xi−1 or Xb, and hence the penultimate occurrence TFi−1 or TFb could read it and process it. Again previously, the antepenultimate occurrence TMi−2 or TFa produced and recorded in memory M the antepenultimate datum Xi−2 or Xa, so that the antepenultimate occurrence TFi−2 or TFa could read it and process it.

The timing diagram in FIG. 2 shows a problematic situation. Here, a child task TF, i.e. the second occurrence TFb, disappears. It follows that the corresponding datum Xb is neither read nor processed by the absent occurrence TFb. Next, depending on whether or not a data-protection mechanism is present, the data Xb is either never read and therefore never processed or, as illustrated, is read and processed but by the next occurrence, or the following occurrence TFc of the child task TF. Both cases are problematic and are cases of data corruption or inconsistency.

It will be noted that, here, unlike the case of FIG. 1, if TFc is the last occurrence of the child task and is denoted TFi, its immediately preceding occurrence is, in the absence of an occurrence TFb, the occurrence TFa, which is then, here, the penultimate occurrence TFi−1.

It is important to note that the relative indexes still apply, but only to occurrences that actually exist, i.e. to tasks occurrences of which were actually executed. Here, when the absolute occurrence TFb disappears, the (penultimate) relative index i−1 is transferred to the preceding actually executed occurrence, i.e. to the occurrence TFa.

SUMMARY OF THE INVENTION

The objective of the invention is to provide a method for detecting a disappearance of a task, which method is capable of operating independently of the operating system and of providing an indication of detection of disappearance as rapidly as possible.

This objective is achieved by virtue of a method for detecting a disappearance of a task in an environment comprising at least one recurring parent task that triggers, in nominal mode, on each occurrence, at least one child task, and comprising the following steps: evaluating a parent duration elapsed between the last occurrence and the penultimate occurrence of the parent task, evaluating a child duration elapsed between the last occurrence and the penultimate occurrence of the child task, comparing the parent duration and the child duration, it being concluded that an occurrence of the child task has disappeared, and an alarm generated, if the child duration, preferably with a margin, is longer than the parent duration.

According to another feature, it is concluded that an occurrence of the child task has disappeared if the child duration, preferably with a margin, is equal to the sum of the last parent duration and of the penultimate parent duration.

According to another feature, the sum of the last parent duration and of the penultimate parent duration is approximated by twice the last parent duration.

According to another feature, the margin is equal to p times a triggering delay, the triggering delay being equal to the duration between the trigger of a child task by a parent task and the start of execution of the child task, with p an integer, which is preferably equal to 2, and also preferably the margin is equal to 1 ms.

According to another feature, each occurrence of a task records its execution date, preferably in a shared memory, in order to prepare for the evaluation of the parent duration and of the child duration, respectively.

According to another feature, a parent duration is evaluated by an occurrence of the parent task and/or a child duration is evaluated by an occurrence of the child task.

According to another feature, the parent duration and the child duration, respectively, are evaluated by comparing the execution date of an occurrence, which is read from the record in memory or known if the occurrence is the occurrence that performs the computation, with the execution date of the previous occurrence of the parent task and of the child task, respectively, which is read from the record in memory.

According to another feature, the evaluation of the parent duration DTMi and/or the evaluation of the child duration DTFi is recorded, after its computation, preferably in a shared memory M, in order to prepare for the comparison.

According to another feature, the step of comparing the parent duration and the child duration is carried out by an occurrence of the child task.

According to another feature, when an occurrence of the child task concludes that an occurrence of the child task has disappeared, this disappeared occurrence is the immediately preceding occurrence.

According to another feature, the parent task is aperiodic.

According to another feature, the parent task and the child task are executed in an environment containing multiple processing units, and preferably on different processing units.

According to another feature, the method is implemented in an engine control unit, the parent task being synchronous with an event related to engine speed.

According to another feature, the parent task is a task of detecting a given angular position of the crankshaft, such as the top-dead-center (TDC) position, and the child task is a task of executing processing operations following such a detection.

BRIEF DESCRIPTION OF THE DRAWINGS

Other innovative advantages and features of the invention will become apparent on reading the following completely non-limiting description, which is given by way of indication, with reference to the appended drawings, in which.

DESCRIPTION OF THE PREFERRED EMBODIMENTS

For greater clarity, identical or similar elements have been designated by identical reference signs throughout the figures.

The invention relates to a method for detecting a disappearance of a task in an environment comprising at least one recurring parent task TM. Each occurrence TMi, TMi−1, TMi−2 of this task triggers at least one child task TF. It will be noted that that this triggering occurs in nominal mode. Specifically, the deletion of a task may be caused by the parent task TM not triggering the child task TF. This case is also detected by the method of the invention.

The loss of a task may be critical in the context of engine control. Thus, for example, in the case of a task detecting a top dead center, the disappearance of a task leads to passage to detection of the next top dead center, i.e. the top dead center corresponding to the next cylinder. The computation of the cylinder number to which the combustion parameters must be applied is then incorrect. As a result, for example, the quantity of fuel injected is no longer optimal. Such a detrimental situation leads to the emission of polluting products and/or over-consumption. The objective of the method is to avoid such situations and their consequences.

The detecting method is characterized in that it comprises the following steps. In a first step, a parent duration DTMi elapsed between the last occurrence TMi and the penultimate occurrence TMi−1 of the parent task TM is evaluated.

Figure 1:
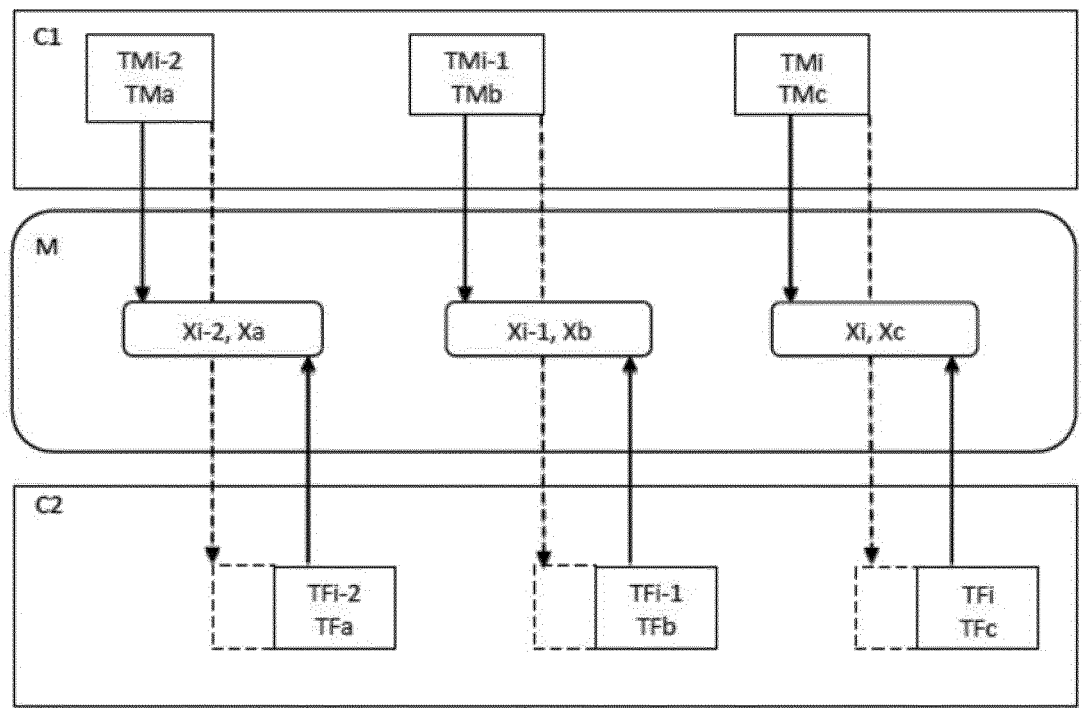
FIG. 1, which has already been described, shows a timing diagram illustrating a nominal situation, FIG. 2, which has already been described, shows a timing diagram illustrating a problematic situation, with a disappearance of an occurrence of the child task.
Figure 2:
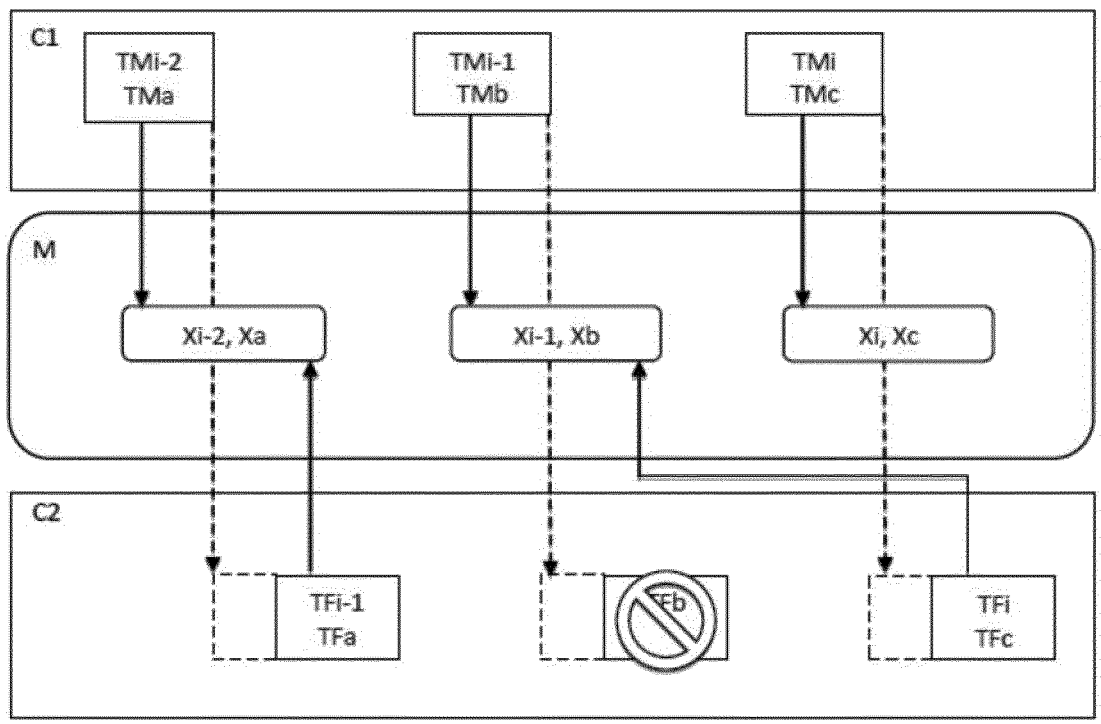
Figure 3:
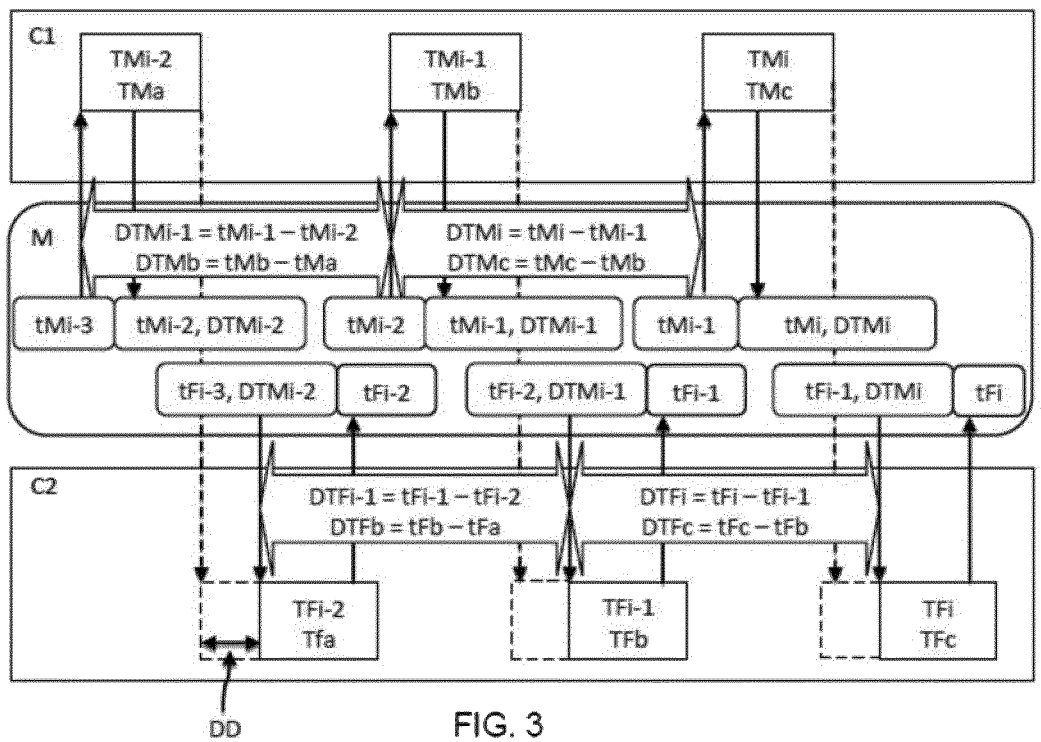
FIG. 3 shows a timing diagram illustrating a solution to the problem, in the nominal situation.
Figure 4:
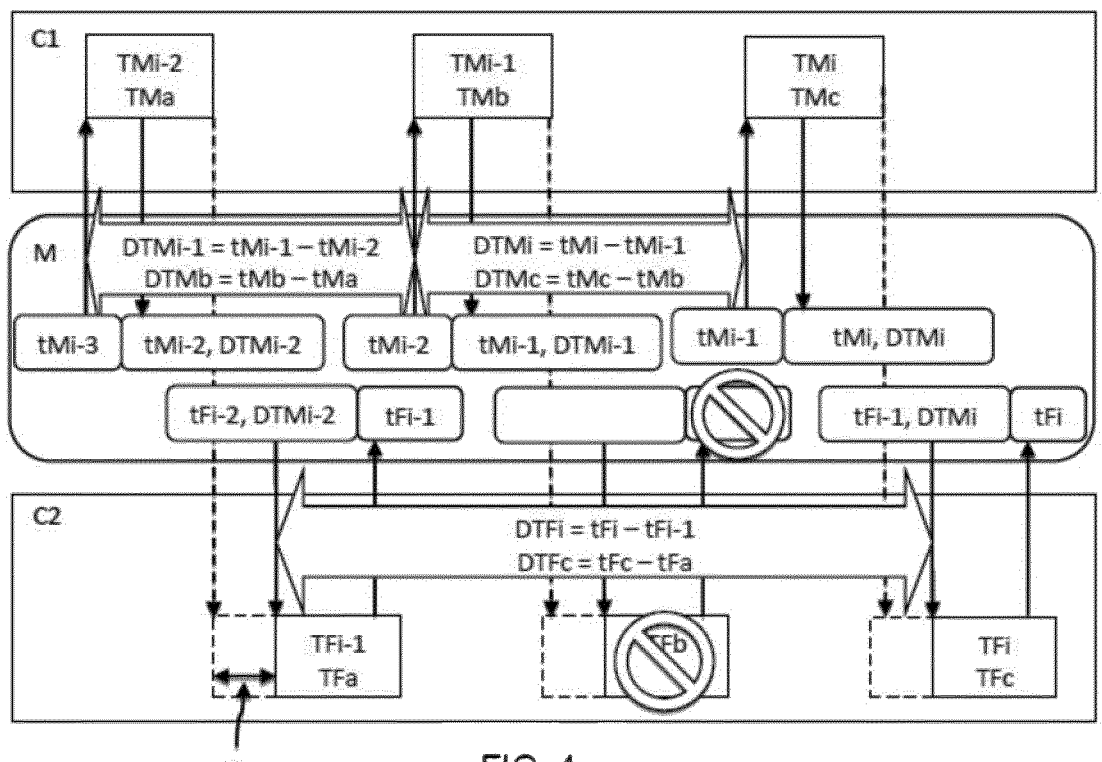
FIG. 4 shows a timing diagram illustrating a solution to the problem, in the problematic situation, with a disappearance of an occurrence of the child task.

Likewise, in a second step, a child duration DTFi elapsed between the last occurrence TFi and the penultimate occurrence TFi−1 of the child task TF is evaluated. These two durations DTMi and DTFi are then compared. In a nominal situation, in which no occurrence of a task has disappeared, as illustrated in FIG. 3, these two durations DTMi and DTFi are substantially equal. In contrast, in a problematic situation, such as illustrated in FIG. 4, in which at least one occurrence of the child task TF has disappeared, the child duration DTFi is clearly longer than the parent duration DTMi. Thus, it is concluded that an occurrence of the child task TF has disappeared if the child duration DTFi, preferably with a margin, is longer than the parent duration DTMi.

In the case where it is concluded that a disappearance has occurred, the method further comprises generating an alarm. The form of this alarm depends on the function associated with the task. It may be a question of a record of a state in a memory of a computer, such as the engine control unit, this record more particularly being intended for maintenance personnel, or it may even be a question of a signal for the attention of the driver of the vehicle, a warning light on the instrument panel or an audible signal being triggered for example.

This technical feature allows a disappearance of an occurrence of the child task TF to be detected immediately.

In order to obtain a more robust disappearance detection, the previous condition: DTFi>DTMi+margin, may be replaced by an alternative condition: DTFi≈DTMi+DTMi−1+/−margin. In other words, it is concluded that an occurrence of the child task TF has disappeared if the child duration DTMi, preferably with a margin, is equal to the sum of the last parent duration DTMi and of the penultimate parent duration DTMi−1. Such an alternative condition advantageously makes it possible to prevent a delayed occurrence from being mistakenly considered to have disappeared. It has the drawback of not allowing a plurality of successive disappeared occurrences to be detected.

The parent task TM may be periodic. In this case, the last parent duration DTMi and the penultimate parent duration DTMi−1 are equal. The parent task TM may also be aperiodic. This is the case, for example, with a parent task TM indexed to an event related to engine speed. In this case, the last parent duration DTMi and the penultimate parent duration DTMi−1 are different. However, the difference remains small and the assumption of equality may be made, at least over a few successive pseudo-periods. Thus, in both cases (periodic or aperiodic), the sum of the last parent duration DTMi and of the penultimate parent duration DTMi−1 may be approximated by twice the last parent duration DTMi.

It will be noted that this model may be generalized to the case of detection of multiple successive missing occurrences. It is then concluded that an occurrence of the child task TF has disappeared if the child duration DTMi is substantially equal, with a margin, to one of the sums of the preceding parent durations, or, adopting the simplifying assumption, equal, with a margin, to q×DTMi, with q an integer equal to 2 or 3 . . . or n, with n the depth (i.e. the number of successive disappeared tasks) at which detection of disappearance of a task is desired.

The child task TF follows the, periodic or aperiodic, model of the parent task TM.

The margin may be any margin. Its function is to add a tolerance, so as to prevent the condition of detection from being thrown off and a delayed occurrence from mistakenly being considered to have disappeared.

According to one possible embodiment, the margin is equal to p times a triggering delay DD. The triggering delay DD is equal to the duration between the trigger of a child task TF by a parent task TM and the start of execution of the child task TF, this delay being represented by a dashed rectangle in FIGS. 1-4. The triggering delay DD is substantially constant, irrespectively of the period or pseudo-period between two occurrences of a parent or child task and of the loads on the processing units. p is an integer, and preferably equal to 2. According to another preferred embodiment, the margin is equal to 1 ms.

To compute the parent and child durations DTM, DTF, according to one possible embodiment, each occurrence TMi, TMi−1, TMi−2, TFi, TFi−1, TFi−2 of a parent or child task TM, TF records its respective execution date tMi, tMi−1, tM−i2, tFi, tFi−1, tFi−2. This record is preferably stored in a shared memory M. Thus the corresponding next occurrence may read this value and compute the duration DTM, DTF, by comparison with its own execution date. This feature advantageously applies both to the parent task TM, with respect to computation of the parent duration DTM, and to the child task TF, with respect to computation of the child duration DTF.

Thus, if reference is made to FIG. 3, the first occurrence TMa or TMi−2 of the parent task TM, on execution thereof, records its execution date tMi−2 or tMa in the memory M, the next occurrence, the second occurrence TMb or TMi−1 of the parent task TM, on execution thereof, records its execution date tMi−1 or tMb in the memory M, and the next occurrence, the third occurrence TMc or TMi of the parent task TM, on execution thereof, records its execution date tMi or tMc in the memory M. Likewise, the first occurrence TFa or TFi−2 of the child task TF, on execution thereof, records its execution date tFi−2 or tFa in the memory M, the next occurrence, the second occurrence TFb or TFi−1 of the child task TF, on execution thereof, records its execution date tFi−1 or tFb in the memory M and the next occurrence, the third occurrence TFc or TFi of the child task TF, on execution thereof, records its execution date tFi or tFc in the memory M.

According to one advantageous embodiment, a parent duration DTMi is evaluated by an occurrence TMi of the parent task TM. Advantageously, an occurrence TMi of the parent task TM evaluates the parent duration DTMi that separates it from the immediately preceding occurrence TMi−1 of the parent task TM. Analogously, a child duration DTFi is evaluated by an occurrence TFi of the child task TF. Advantageously, an occurrence TFi of the child task TF evaluates the child duration DTFi that separates it from the immediately preceding occurrence TFi−1 of the child task TF.

According to one embodiment, the parent duration DTMi and the child duration DTFi, respectively, are evaluated by comparing the execution date tMi, tFi of an occurrence TMi, TFi, which is read from the record or known if the occurrence TMi, TFi is the occurrence that performs the computation, with the execution date tMi−1, tFi−1 of the previous occurrence of the parent task TM and of the child task TF, respectively, which is read from the record.

Thus, if reference is made to FIGS. 3 and 4, the penultimate parent duration DTMi−1 is advantageously evaluated by the second occurrence TMb or TMi−1 of the parent task TM. This occurrence, during its execution, reads, from the memory M, the execution date tMi−2 or tMa recorded in the memory by the preceding occurrence TMa or TMi−2. The second occurrence TMb or TMi−1 of the parent task TM, which performs the evaluation, advantageously knows its own execution date tMb or tMi−1 and does not have to read it from the memory M. The evaluation may then be obtained by computing the difference tMb−tMa=tMi−1−tMi−2=DTMi−1. Analogously, the last parent duration DTMi is advantageously evaluated by the third occurrence TMc or TMi of the parent task TM. This occurrence, during its execution, reads, from the memory, the execution date tMi−1 or tMb recorded in the memory by the preceding occurrence TMb or TMi−1. The third occurrence TMc or TMi advantageously knows its own execution date tMc or tMi. The evaluation may then be obtained by computing the difference tMc−tMb=tMi−tMi−1=DTMi.

With reference to FIG. 3, a similar process allows the second occurrence TFb or TFi−1 of the child task TF to evaluate the child duration DTFi−1. This occurrence, during its execution, reads, from the memory M, the execution date tFi−2 or tFa recorded in the memory by the preceding occurrence TFa or TFi−2. The second occurrence TFb or TFi−1 advantageously knows its own execution date tFb or tFi−1. The evaluation may then be obtained by computing the difference tFb−tFa=tFi−1−tFi−2=DTFi−1. Analogously, the third occurrence TFc or TFi of the child task TF evaluates the child duration DTFi. This occurrence, during its execution, reads, from the memory M, the execution date tFi−1 or tFb recorded in the memory by the preceding occurrence TFb or TFi−1. The third occurrence TFc or TFi advantageously knows its own execution date tFc or tFi. The evaluation may then be obtained by computing the difference tFc−tFb=tFi−tFi−1=DTFi.

With reference to FIG. 4, the second occurrence TFb of the child task TF has disappeared and cannot evaluate the child duration DTFb or DTFi−1. The third occurrence TFc or TFi of the child task TF evaluates the child duration DTFi or DTFc. This occurrence, during its execution, reads, from the memory, the execution date tFi−1, which here is tFa, recorded in the memory by the preceding occurrence TFa or TFi−1. The third occurrence TFc or TFi advantageously knows its own execution date tFc or tFi. The evaluation may then be obtained by computing the difference tFc−tFa=tFi−tFi−1=DTFi.

Thus each occurrence of the parent task TM and of the child task TF, respectively, computes the parent duration DTM and the child duration DTF, respectively, separating it from the previous occurrence.

According to another advantageous feature, each occurrence of the parent task TM, after having evaluated its parent duration DTM, records it, preferably in the shared memory M, so that it may be read by another occurrence. Alternatively or in addition, each occurrence of the child task TF, after having evaluated its child duration DTF, records it, preferably in the shared memory M, so that it may be read by another occurrence.

If the two parent and child durations DTM, DTF are both recorded, any entity that has access to the shared memory M may read them and perform the comparison.

According to another feature, the comparing step is advantageously carried out by an occurrence TFi of the child task TF. The occurrence TFi reads, from the memory M, the corresponding parent duration DTMi recorded beforehand by the corresponding occurrence TMi of the parent task TM. The occurrence TFi will then know the child duration DTFi, which it will have just evaluated, and the parent duration DTMi, of corresponding rank, which it will have just read, and may compare them. In this case, only the parent duration DTMi needs to be recorded and read, the child duration DTFi being known if the occurrence TFi of the child task TF computes the child duration DTFi and performs the evaluation.

Thus, with reference to FIG. 3, the second occurrence TFb or TFi−1 of the child task TF reads, from the memory, the corresponding parent duration DTMi−1 (of same rank). It knows the child duration DTFi−1, which it has evaluated, and may then compare the two corresponding parent and child durations DTMi−1, DTFi−1 (of same rank). Likewise, the third occurrence TFc or TFi of the child task TF reads, from the memory, the corresponding parent duration DTMi (of same rank). It knows the child duration DTFi, which it has evaluated, and may then compare the two corresponding parent and child durations DTMi, DTFi. The comparison here is positive.

With reference to FIG. 4, the second occurrence TFb has disappeared and cannot carry out any processing. The comparison is not made for this rank. The third occurrence TFc or TFi of the child task TF reads, from the memory, the corresponding parent duration DTMi (of same rank). It knows the child duration DTFi, which it has evaluated, and may then compare the two corresponding parent and child durations DTMi, DTFi. The comparison here is negative.

When an occurrence that compares the parent and child durations DTM, DTF concludes that an occurrence of the child task TF has disappeared, this disappeared occurrence is the immediately preceding occurrence. Thus with reference to FIG. 4, when the last occurrence TFi or TFc of the child task TF concludes that an occurrence of the child task TF has disappeared, this disappeared occurrence is the penultimate occurrence TFi−1 or TFb that precedes the occurrence TFi or TFc.

Thus, a disappearance may, according to the invention, be detected very rapidly after its occurrence.

The invention is particularly advantageous when the parent task TM and the child task TF are executed in an environment containing multiple processing units C1, C2, and preferably on different processing units C1, C2. Such an environment favors the appearance of the problem of deletion of an occurrence of a task.

The invention is applicable to engine control, preferably when the parent task TM is synchronous with an event related to engine speed.

For example, the parent task TM is a task of detecting a given angular position of the crankshaft, such as the top-dead-center (TDC) position, and the child task TF is a task of executing processing operations following such a detection. A deletion of an occurrence of the child task deletes a detection of a position and the processing thereof. Thus, the data to be refreshed on the execution of the child task are not refreshed and detrimentally keep their previous value.

The invention has been described above by way of example. It will be understood that a person skilled in the art will be able to produce various variant embodiments of the invention, for example by combining the various above features, which may be implemented alone or in combination, without however departing from the scope of the invention.

The invention claimed is:

1. A method carried out by a processing unit of a computer for detecting a disappearance of a child processing task from an operating environment of the computer, the operating environment executing a recurring parent processing task (TM), the method comprising the following steps:
   at each occurrence of the parent task (TM), recording an execution date of the parent task (TM) into a shared memory (M) of the computer;

triggering an occurrence of the child task (TF) on each occurrence of the parent task (TM), the child task (TF) recording an execution date of the child task (TM) into the shared memory (M);

evaluating a parent duration (DTMi) elapsed between an execution date of a last occurrence (TMi) of the parent task (TM), and an execution date of a penultimate occurrence (TMi−1) of the parent task (TM);

evaluating a child duration (DTFi) elapsed between an execution date of a last occurrence (TFi) of the child task (TF) triggered by the parent task (TM), and an execution date of a penultimate occurrence (TFi−1) of the child task (TF);

comparing the parent duration (DTMi) and the child duration (DTFi); and determining that the child duration (DTFi) is longer than the parent duration (DTMi) to detect that the child task (TF) has disappeared, and subsequently generating an alarm for executing countermeasures to correct for the disappeared child task.

2. The method as claimed in claim 1, wherein said determining detects that the child task (TF) has disappeared when the child duration (DTMi) is substantially equal to a sum of the last parent duration (DTMi) and the penultimate parent duration (DTMi−1).

3. The method as claimed in claim 1, wherein said determining detects that the child task (TF) has disappeared when the child duration (DTMi) is substantially equal to twice the last parent duration (DTMi).

4. The method as claimed in claim 2, wherein said determining that the child duration (DTMi) is substantially equal to the sum of the last parent duration (DTMi) and the penultimate parent duration (DTMi−1) includes a margin equal to a number p times a triggering delay (DD), the triggering delay (DD) being equal to the duration between the trigger of the child task (TF) by the parent task (TM) and a start of execution of the child task (TF), and the number p being an integer.

5. The method as claimed in claim 1, wherein the parent duration (DTMi) is evaluated by an occurrence (TMi) of the parent task (TM) and/or the child duration (DTFi) is evaluated by an occurrence (TFi) of the child task (TF).

6. The method as claimed in claim 1, wherein the parent duration (DTMi) and the child duration (DTFi), respectively, are evaluated by comparing the execution date (tMi, tFi) of respective occurrences (TMi, TFi) of the parent duration (DTMi) and the child duration (DTFi) with an execution date (TMi−1, TFi−1) of the previous occurrence of the parent task (TM) and of the child task (TF), respectively, which is read from the record in the shared memory (M).

7. The method as claimed in claim 1, wherein the evaluation of the parent duration (DTMi) and/or the evaluation of the child duration (DTFi) is recorded in the shared memory (M).

8. The method as claimed in claim 1, wherein the step of comparing the parent duration (DTMi) and the child duration (DTFi) is carried out by an occurrence (TFi) of the child task (TF).

9. The method as claimed in claim 8, wherein, when the determining is carried out by a subsequent child task immediately subsequent to the child task (TF) that has disappeared.

10. The method as claimed in claim 1, wherein the parent task (TM) is aperiodic.

11. The method as claimed in claim 1, wherein the operating environment in which the parent task (TM) and the child task (TF) are executed contains multiple processing units (C1, C2).

12. The method as claimed in claim 1, wherein the computer is an engine control unit, and the parent task (TM) is synchronous with an event related to an engine speed of the engine.

13. The method as claimed in claim 12, wherein the parent task (TM) is a task of detecting a given angular position of a crankshaft of the engine, and the child task (TF) is a task of executing processing operations following a detection of said given angular position.

14. The method of claim 1, wherein the determining step incorporates a margin for determining that the child duration (DTFi) is longer than the parent duration (DTMi) before generating the alarm.

15. The method as claimed in claim 4, wherein the number p is equal to 2.

16. The method as claimed in claim 15, wherein the margin is equal to 1 ms.

17. A computer, equipped with a plurality of processing units and a shared memory (M), which detects a disappearance of a child processing task from an operating environment of the computer, the computer configured to:

execute a recurring parent processing task (TM);

at each occurrence of the parent task (TM), record an execution date of the parent task (TM) into the shared memory (M) of the computer;

trigger an occurrence of the child task (TF) on each occurrence of the parent task (TM), the child task (TF) recording an execution date of the child task (TM) into the shared memory (M);

evaluate a parent duration (DTMi) elapsed between an execution date of a last occurrence (TMi) of the parent task (TM), and an execution date of a penultimate occurrence (TMi−1) of the parent task (TM);

evaluate a child duration (DTFi) elapsed between an execution date of a last occurrence (TFi) of the child task (TF) triggered by the parent task (TM), and an execution date of a penultimate occurrence (TFi−1) of the child task (TF);

compare the parent duration (DTMi) and the child duration (DTFi); and when the child duration (DTFi) is longer than the parent duration (DTMi), generate an alarm that the child task (TF) has disappeared in order to execute countermeasures to correct for the disappeared child task.

18. The computer of claim 17, wherein the computer is an engine control unit, and the parent task (TM) is synchronous with an event related to an engine speed of the engine.

19. The computer of claim 18, wherein the parent task (TM) is a task of detecting a given angular position of a crankshaft of the engine, and the child task (TF) is a task of executing processing operations following a detection of said given angular position.

* * * * *